US012771604B2

(12) United States Patent
Gallagher et al.

(10) Patent No.: US 12,771,604 B2
(45) Date of Patent: Oct. 20, 2026

(54) MODIFICATION OF CLUSTER CONFIGURATION SETTINGS USING MACHINE LEARNING

(71) Applicant: RED HAT, INC., Raleigh, NC (US)

(72) Inventors: Brian Gallagher, Waterford (IE); Cathal O'Connor, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 60 days.

(21) Appl. No.: 18/666,971

(22) Filed: May 17, 2024

(65) Prior Publication Data

US 2025/0358185 A1 Nov. 20, 2025

(51) Int. Cl.

*H04L 41/08* (2022.01)
*H04L 41/0893* (2022.01)
*H04L 41/16* (2022.01)

(52) U.S. Cl.

CPC ...... *H04L 41/0883* (2013.01); *H04L 41/0893* (2013.01); *H04L 41/16* (2013.01)

(58) Field of Classification Search

CPC .......... G06N 20/00; G06N 3/08; G06N 5/022; G06N 5/04; G06N 7/01; H04L 41/0823; H04L 41/0883; H04L 41/0893; H04L 41/14; H04L 41/142; H04L 41/16; H04L 67/10

See application file for complete search history.

(56) References Cited

U.S. PATENT DOCUMENTS

| | | | | |
|---|---|---|---|---|
| 11,343,146 | B1 * | 5/2022 | Mohanty | H04L 41/0816 |
| 2014/0007092 | A1 * | 1/2014 | Barbee | G06F 9/4856 718/1 |
| 2020/0233690 | A1 * | 7/2020 | Bhatnagar | H04L 67/75 |
| 2021/0224178 | A1 * | 7/2021 | Singh | G06F 9/44505 |
| 2021/0359976 | A1 * | 11/2021 | O'Hara | H04L 41/0893 |
| 2024/0015080 | A1 * | 1/2024 | Illikkal | G06F 9/5011 |
| 2024/0349069 | A1 * | 10/2024 | Soulhi | H04W 16/18 |
| 2025/0240219 | A1 * | 7/2025 | Kote | H04L 41/16 |

* cited by examiner

*Primary Examiner* — Christopher Biagini

(74) *Attorney, Agent, or Firm* — Kilpatrick Townsend & Stockton LLP

(57) ABSTRACT

A system can be provided for modifying cluster configuration settings using machine learning. For example, the system can determine a numerical value representative of a configuration setting at an active computing cluster. The system can further compute a set of similarity scores using the numerical value. Each similarity score in the set of similar scores can be indicative of a level of similarity of the active computing cluster to each of a set of computing clusters with respect to the configuration setting. The system can further select, based on the set of similarity scores and using a machine learning model, a subset of computing clusters from the set of computing clusters. The system can then generate a recommended modification to the configuration setting based on the subset of computing clusters. Additionally, the system can execute a modification operation to implement the recommended modification to the configuration setting.

20 Claims, 3 Drawing Sheets

MODIFICATION OF CLUSTER CONFIGURATION SETTINGS USING MACHINE LEARNING

TECHNICAL FIELD

The present disclosure relates generally to distributed computing environments and, more particularly (although not necessarily exclusively), to modifying cluster configuration settings using machine learning.

BACKGROUND

Distributed computing systems (e.g., cloud computing systems, data grids, and computing clusters) have recently grown in popularity given their ability to improve flexibility, responsiveness, and speed over conventional computing systems. These distributed computing environments may include dozens or hundreds of nodes interconnected via one or more networks. The nodes can be physical machines executing software processes, such as microservices, serverless functions, and applications. The nodes can execute the software processes to service various types of computer workloads ("workloads"), such as video conferencing, web surfing, voice communications, and data processing workloads.

DETAILED DESCRIPTION

Figure 1:
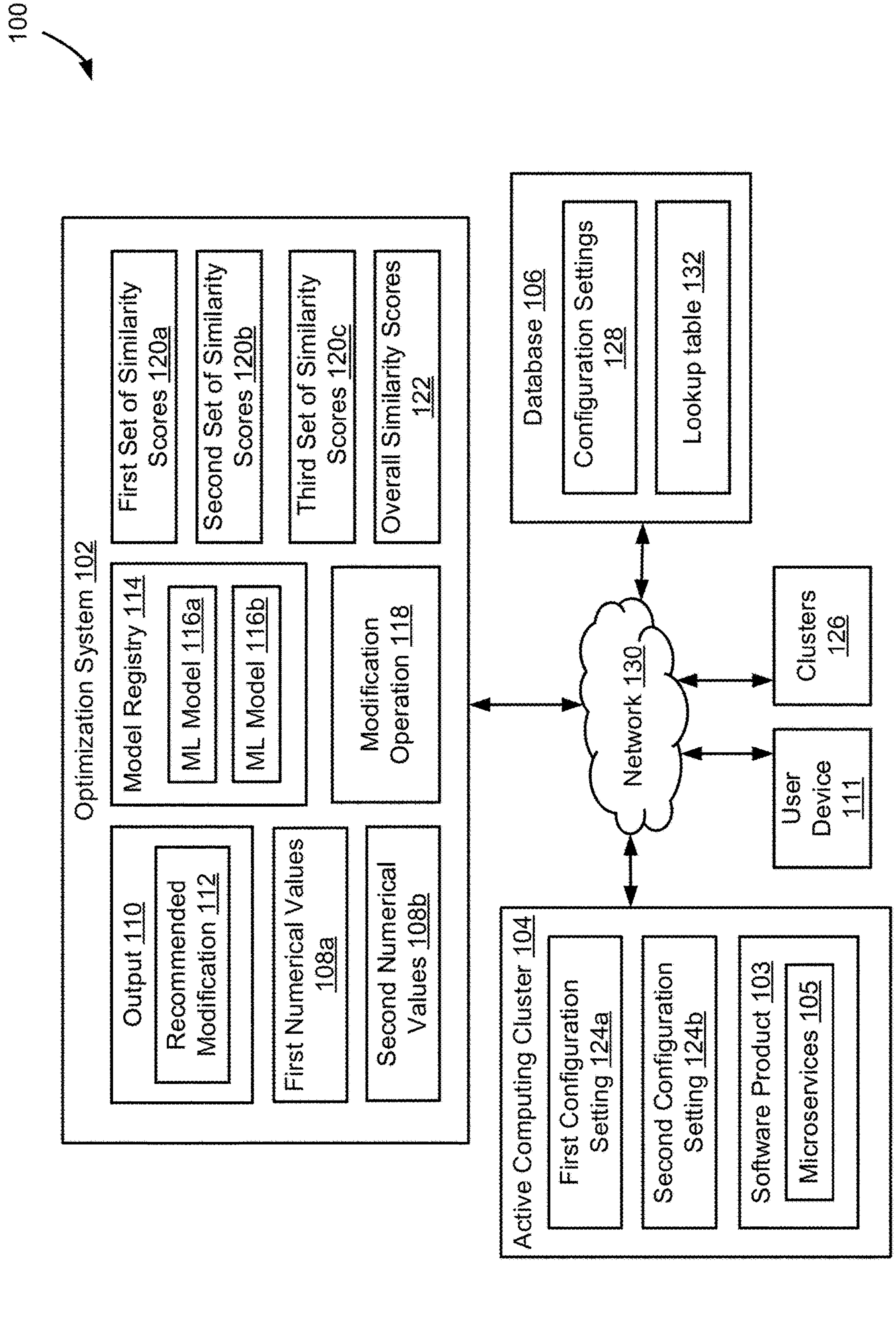
FIG. 1 shows a block diagram of an example of a distributed computing environment for modifying cluster configuration settings using machine learning, according to some aspects of the present disclosure.

A software product can be deployed in a distributed computing environment via a cluster (e.g., a set of nodes). The software product can be comprised of various microservices (e.g., can have a distributed microservice architechecture), which may run independently of one another on the nodes. For software products with the distributed microservice architecture, inconsistent or conflicting configuration settings across the microservices can cause operational challenges. For example, the inconsistent or conflicting configuration settings can complicate debugging, testing, and deployment of the software product, thereby reducing reliability of the cluster. In one particular example, microservices of the software product may use incompatible security protocols for inter-service communication. As a result, secure communication between the microservices may be difficult, which can reduce reliability of the cluster by, for example, causing loss of data, data breaches, or compromised security for the software product. Additionally, conflicting configuration settings, such as differing database connection strings or caching mechanisms, may disrupt microservice operations, thereby causing latency, data corruption, or otherwise degrading performance of the software product. Furthermore, discrepancies in configuration settings related to resource allocation can prevent some microservices from accessing sufficient computing resources, which may also cause latency and degrade performance of the software product.

Some examples of the present disclosure can overcome one or more of the abovementioned problems via a system that can modify cluster configuration settings using machine learning. To do so, the system may identify configuration settings related to performance of a software product running on an active computing cluster (i.e., a computing cluster being analyzed). Additionally or alternatively, the system may identify conflicting or inconsistent configuration settings of the active computing cluster or software product. The system may then use one or more machine learning models to select a set of computing clusters related to the active computing cluster. The set of computing clusters may exhibit optimized performance (e.g., have resource usage, error rates, or response times within optimal ranges). Based on the set of computing clusters, the system may generate one or modification recommendations for the active computing cluster.

For example, a modification recommendation can indicate that a configuration setting related to a security protocol, computing resource usage, a database connection, a caching mechanism, a logging level, an environment, a replica count, or the like of a microservice of the software product should be adjusted. The modification recommendation can further include a value (e.g., a particular security protocol, an amount of memory or CPU, a database server address, a port, a number of replicas, or the like), which can be used to adjust the configuration setting. As a result, the system can assess and amend conflicting or inconsistent configuration settings of the software product, the active computing cluster, or the combination thereof. Additionally, due to the set of computing clusters being optimized, the recommended modifications based on the set of computing clusters can optimize performance of the active cluster. Therefore, the system can generate modifications to configuration settings that improve performance of the software product and optimize computing resource usage across the active computing cluster.

In a particular example, a software product deployed at an active computing cluster can be a video streaming platform. The system may receive a request from a user device to optimize configuration settings of the software product. In response, the system can identify a configuration setting with a high impact on performance of the software product. For example, the system can identify a configuration setting related to CPU allocation to a microservice of the software product that processes user data. After identifying the configuration setting, the system can determine a numerical value representative of the configuration setting. The numerical value can be a number of CPU cores allocated to the microservice.

The system can then compute a set of similarity scores using the numerical value. To do so, the system can access a database comprising configuration settings for other computing clusters. The other computing clusters can be clusters previously optimized by the system. Based on the configuration settings in the database, the system can identify a number of CPU cores used for similar microservices of the other clusters. The system can then compute each similarity score by inputting the numerical value and the number of CPU cores for each of the other clusters into a similarity equation (e.g., Cosine similarity). As a result, each similarity score in the set of similar scores can indicate of a level of similarity of the active computing cluster to each of the other clusters. In particular, the level of similarity can be with respect to the number of CPU cores allocated to microservices for managing user data.

The system can further select a subset of the other computing clusters. For example, the subset can be the most similar computing clusters of the other computing clusters to the active computing cluster. The system may determine the most similar computing clusters based on the computing clusters having high similarity scores, being used to deploy similar software products, or otherwise being highly relevant to the active computing cluster. The system can then generate an output comprising a recommended modification to the configuration setting based on the subset of computing clusters. To do so, the system can use the number of CPU cores provided to the microservice for managing user data in each computing cluster of the subset of computing clusters. The system may use the mean, median, or mode of the number of CPU cores of the subset of computing clusters in the recommended modification. In this way, the system can generate a recommended modification to the configuration setting that is informed by related computing clusters with optimal configuration settings.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 shows a block diagram of an example of a distributed computing environment 100 for modifying cluster configuration settings using machine learning according to some aspects of the present disclosure. In this example, the distributed computing environment 100 can be a cloud computing environment, a computing cluster, or a data grid. The distributed computing environment 100 can include any number of computing clusters, which can be a group of nodes that are communicatively coupled to one another via one or more networks 130, such as a local area network or the internet. In particular, the distributed computing environment 100 can include an active computing cluster ("active cluster") 104. The active cluster 104 can be the computing cluster of the distributed computing environment 100 being analyzed, optimized (e.g., modified), or a combination thereof by an optimization system 102. The optimization system 102 can be communicatively coupled with the active cluster 104, a user device 111, and a database 106 via the one or more networks 130.

The active cluster 104 can include any number of nodes for executing software processes (e.g., microservices 105). The microservices 105 can be configured to carryout workloads of a software product 103 running on the active cluster 104. For example, the software product 103 (e.g., a software application, service, platform, the like) can include a first microservice for handling user authentication and profile management and a second microservice for handling data management and analysis related to application performance. Although the software product 103 is described as having two microservices, any number of microservices can be used to carry out any number of workloads of the software product 103. Each of the microservices 105 can be deployed in a container at one or more nodes of the active cluster 104. Thus, the microservices 105 can execute independently of one another via separate containers. As a result of being deployed at the one or more nodes, the microservices 105 can utilize shared resources (e.g., storage, CPU, memory, container registries, databases, etc.) of the active cluster 104. The shared resources are available to the nodes to carry out the workloads. Examples of the nodes can include computing devices, servers, virtual machines, or any combination of these.

In some examples, it may be desirable to optimize configuration settings of the microservices 105 to improve performance of the software product 103. The configuration settings can be parameters, properties, and values that govern behavior of each microservice. To optimize the configuration settings, the optimization system 102 can identify one or more configuration settings of one or more of the microservices 105 that impact performance of the software product 103. Examples of the configuration settings can include general settings (e.g., an environment in which each microservice runs, log levels of each microservice, etc.), database settings (e.g., an address of a database server, a port on which a database server listens, or credentials for database access), CPU settings (e.g., a minimum amount of CPU resources allocated to each microservice, a maximum amount of CPU each microservice can use, etc.), memory settings (e.g., a minimum amount of memory allocated to each microservice, a maximum amount of memory each microservice can use, etc.), storage settings (e.g., persistent volume claims or ephemeral storage).

In a particular example, a first configuration setting 124*a* identified by the optimization system 102 can be the environment in which each microservice runs. Additionally, a second configuration setting 124*b* identified by the optimization system 102 can be a log level of the first microservice. The optimization system 102 can identify the configuration settings 124*a-b* based on user selections of the configuration settings 124*a-b* at the user device 111. The user device 111 can be a server, desktop computer, laptop computer, mobile phone, wearable device such as a smart watch, networking hardware (e.g., gateways, firewalls, and routers), or any combination of these. The configuration settings 124*a-b* can be selected manually by a user of the user device 111. For example, the optimization system 102 can be part of or communicatively coupled with a container orchestration platform (e.g., Kubernetes). Thus, the user may access and identify the configuration settings 124*a-b* using configuration files stored and managed by the container orchestration platform.

Alternatively, the optimization system 102 can automatically select the configuration settings 124*a-b* using predefined rules. For example, the predefined rules can include threshold values for various performance metrics (e.g., latency or response times, throughput, error rates, CPU usage, memory usage, network bandwidth usage, or the like) of each microservice or of the software product 103. The predefined rules may then indicate one or more configuration settings to identify for a performance metric or a group of performance metrics being greater than or less than corresponding thresholds.

In another example, the optimization system 102 can access a model registry 114 comprising trained machine learning (ML) models (e.g., a first ML model 116*a* and a second ML model 116*b*). The first machine learning model 116*a* can be trained to output the configuration settings of the active cluster 104*a* with a largest impact on performance of the software product 103. To do so, the first ML model 116*a* can receive a set of configuration settings associated with the software product 103 and can output a subset of the configuration settings (e.g., configuration settings 124*a-b*). The first ML model 116*a* can be trained using a dataset of clusters and corresponding subsets of their configuration settings that most impact performance. In some examples, the first ML model 116*a* can further be trained to predict the subset of configuration settings based on predictive criteria such as characteristics of the cluster (e.g., a number or types of nodes, a number or type of networks used, workload size or type, etc.) or based on the presence or absence of particular configuration settings. The first machine learning model 116*a* can be a classification model (e.g., a model utilizing logistic regression, decision trees, support vector machines, neural networks, or the like), a feature selection model (a model utilizing recursive feature elimination, random forest feature important, or least absolute shrinkage and selection operator), a clustering model (e.g., a model utilizing k-means clustering, gaussian mixture models, etc.), or another suitable type of ML model.

The optimization system 102 can further determine a numerical value representative of each configuration setting identified for the active cluster 104. In some examples, the configuration setting may be a number (e.g., amount of memory allocated to each microservice or a number of CPU cores allocated to a microservice). In such examples, the value of the configuration setting can be used as the numerical value representative of the configuration setting. In other examples, the configuration setting can be represented by a Boolean value (e.g., true/false or on/off). For example, caching, auto-scaling, two-factor authentication, debugging mode, or other suitable behavior of the software product can be controlled by a Boolean value of a corresponding configuration setting. In examples in which the configuration setting is represented by a Boolean value, the optimization system can determine a numerical value for true/on (e.g., 1) and another numerical value for false/off (e.g., 0). Additionally, in some examples, configuration settings can be represented by string values. For example, deployment environment, execution mode, user roles, API keys, network configuration settings, or the like can be represented by string values. Thus, the optimization can determine and associate a numerical value with each string value for a particular configuration setting. The numerical values associated with string or Boolean values of configuration settings can be predefined. In some examples, the optimization system 102 may determine the numerical value by accessing a lookup table 132 or other suitable means for associating each string or Boolean value with a numerical value.

In the particular example, the environment in which each microservice runs can be represented by a string value. For example, the first configuration setting 124*a* of the first microservice can have a string value of "development" while the first configuration setting 124*a* of the second microservice can have a string value of "production". The optimization system 102 can determine a numerical value (e.g., one) to represent deployment and can determine another numerical value to represent production (e.g., four). The numerical values (e.g., one, two, three, four) for the first configuration setting 124*a* may be predefined and stored in the lookup table 132 for each corresponding string value for environment (e.g., "development", "testing", "staging", and "production").

Additionally, the second configuration setting 124*b*, which is the log level of the first microservice, can have a string value of "debug." Based on accessing the lookup table 132, the optimization system 102 can determine another numerical value (e.g., five), which can be representative of the second configuration setting 124*b*. Thus, first numerical values 108*a* associated with the configuration settings 124*a-b* can be one, four, and five. In other examples, any suitable numerical value can be used to represent a configuration setting (e.g., 0, 1, 2, 3, 4, 5, 10, 15, 20, 30, 40, 50, 60, 70, 80, 90, 100, 200, 300, etc., or any number there between).

In some examples, the optimization system 102 can further access information related to computing clusters ("clusters") 126. The clusters 126 can be associated with the software product 103, the active cluster 104, or the distributed computing environment 100. For example, the clusters 126 can be other clusters deployed at the distributed environment 100, clusters with microservices similar to the microservices of the active cluster 104, clusters at which the software product or other versions of the software product are or have been deployed, other related clusters, or a combination thereof. In some examples, at least some of the clusters 126 can be running in the distributed environment 100 or in another distributed environment. Additionally or alternatively, at least some of the clusters 126 can be historical clusters that were previous deployed at the distributed environment 100 or in another distributed environment.

The information related to the clusters 126 can include configuration settings 128 of each of the clusters. The configuration settings 128 of each of the clusters 126 can be software product configuration settings (i.e., configuration settings related to the behavior of one or more software products deployed via the cluster), cluster configuration settings (i.e., configuration settings related to the behavior or structure of the cluster), or the combination thereof. The information can further include adjustments made to the configuration settings 128 of each of the clusters 126 during operation. Additionally, the information can also include the lookup table 132, which may relate each of the configuration settings 128 to numerical values representative of the configuration settings 128. The lookup table 132 may also associate configuration settings not related to the clusters 126 with numerical values. The information associated with the clusters 126 can be stored in the database 106.

Thus, in the particular example, the optimization system 102 can further determine second numerical values 108*b* for the first configuration setting 124*a* and the second configuration setting 124*b* based on the configuration settings 128 of each of the clusters 126. That is, the optimization system 102 can determine a numerical value representative of an environment and log level used for clusters 126 with respect to microservices similar to the first and second microservice of the software product (e.g., microservices related to user authentication, profile management, data management, or the like). As a result, the optimization system 102 can determine three numerical values for each of the clusters 108, which can be compared to the three numerical values in the first numerical values 108*a*.

In some examples, to compare the active cluster 104 to each of the clusters 126, a similarity score can be computed. The similarity score can be computed for each numerical value for each configuration setting of interest. Thus, a numerical value representative of a configuration setting at the active cluster 104 and a numerical value representative of the configuration setting at one of the clusters 126 can be used to compute a particular similarity score. Various equations can be used to compute the similarity score. Some examples of the equations for computing the similarity score can include cosine similarity, Euclidean distance, Manhattan distance, Jaccard similarity, Pearson correlation coefficient, and hamming distance.

In the particular example, a similarity score can be computed for each of the first numerical values 108*a* with respect to each of the clusters 126. That is, the numerical value for the first configuration setting 124*a* with respect to the first microservice and corresponding numerical values from the clusters 126 can be used to calculate a first set of similarity scores 120*a*. Thus, the first set of similarity scores 120*a* can indicate a level of similarity of the active cluster 104 to each of the clusters 126 with respect to the environment of the first microservice. Additionally, the numerical value for the first configuration setting 124*a* with respect to the second microservice and corresponding numerical values from the clusters 126 can be used to calculate a second set of similarity scores 120*b*. The second set of similarity scores 120*b* can therefore indicate a level of similarity of the active cluster 104 to each of the clusters 126 with respect to the environment of the second microservice. Moreover, the numerical value for the second configuration setting 124*b* and corresponding numerical values from the clusters 126 can be used to calculate a third set of similarity scores 120*c*. The third set of similarity scores 120*c* can therefore indicate a level of similarity of the active cluster 104 to each of the clusters 126 with respect to the log level of the first microservice.

After computing the sets of similarity scores 120*a-c*, the optimization system 102 can select a subset of the clusters 126 most similar to the active cluster 104. To do so, the optimization system 102 can input the sets of similarity scores into the second ML model 116*b*. Additionally or alternatively, prior to inputting the sets of similarity scores into the second ML model 116*b*, the optimization system 102 can compute overall similarity scores 122 for each of the clusters 126. For example, each set of similarity scores 120*a-c* can have one similarity score per cluster. To compute the overall similarity scores 122 for each cluster, the optimization system 102 can combine the similarity scores from each set of similarity scores 120*a-c* for a cluster into a single score. To do so, the optimization system can add the similarity scores, average the similarity scores, or compute a weighted average of the similarity scores. As a result, the optimization system 102 can input the one or more of the sets of similarity scores 120*a-c*, the overall similarity scores 122 for each of the clusters 126, or a combination thereof into the second ML model 116*b*. The second ML model 116*b* can be a clustering model trained to select the subset of the clusters 126 most similar to the active cluster 104 based on the input. The second ML model 116 can be trained using a datasets of similarity scores, overall similarity, scores of the combination thereof for clusters and corresponding subsets of the clusters.

As described above, the second numerical values 108*b* can be the numerical values representing configuration settings in the clusters 126 that are most similar to the configuration settings 124*a-b* of the microservices of interest. The second numerical values 108*b* therefore include the numerical values corresponding to the clusters 126 used to compute the similarity scores and select the subset of the clusters 126. Once the subset of the clusters 126 most similar to the active cluster 104 are selected, the optimization system 102 can obtain numerical values for the subset of the clusters 126 from the second numerical values 108*b*. As a result, for each cluster in the subset, the optimization system 102 can obtain a first numerical value for an environment of a first microservice, a second numerical value for an environment of a second microservice, and a third numerical value for a log level of the first microservice.

In some examples, the optimization system 102 can use numerical values for the subset of the clusters 126 to generate an output with recommended modifications to the configuration settings 124*a-b*. For example, the optimization system 102 can use the first numerical values for each of the clusters in the subset to determine a recommended modification to the environment of the first microservice. Additionally or alternatively, the optimization system 102 can use the second numerical values for each of the clusters in the subset to determine a recommended modification to the environment of the second microservice. The optimization system 102 may also use the third numerical values to determine a recommended modification to the log level of the first microservice.

In some examples, the optimization system 102 can generate the recommended modification 112 based on the most common values for the configuration settings among the subset of the clusters. As a result, in the particular example, the output 110 generated with the recommended modification 112 can recommend that both of the microservices be in the "deployment" environment. Additionally, based on the third numerical values, the optimization system 102 can generate the recommended modification 112 to recommend that the log level of the first microservice be change to "error."

The optimization system 102 can then transmit the output 110 to the user device 111. For example, the output 110 can be displayed to a user in an integrated development environment (IDE) running on the user device 111. In addition or alternative to generating the output, the optimization system 102 may automatically execute a modification operation 118 to implement the recommended modification 112 to the configuration settings 124*a-b*. For example, the optimization system 102 can change the value of the log level of the first microservice to "error" and the environment of the second microservice to "development."

Additionally, in some examples, the optimization system 102 may compare a first set of numerical values for configuration settings of the active cluster 104 to a second set of numerical values of each of the clusters 126 to perform anomaly detection with respect to the active cluster 104. For example, the optimization system 102 may identify a cluster of the clusters 126 that is most similar to the active cluster (e.g., a cluster with all of most of the same configuration settings as the active cluster 104). The optimization system 102 may identify the similar cluster based on most of the numerical values in the first set of numerical values being equivalent to the numerical values in the second set of numerical values for the similar cluster.

The optimization system 102 can then determine one or more configuration settings (e.g., configuration settings 124*a-b*) of the active cluster 104 that are different from the corresponding configuration settings of the highly similar cluster. For example, the optimization system 102 can identify the numerical values of the first and second set of numerical values that are not equivalent to determine the configuration settings that are different. The optimization system 102 may further generate an output indicating the configuration settings that are different. Additionally or alternatively, the optimization system 102 can determine a recommended modification to the configuration settings of the active cluster 104 based on the differences. The optimization system 102 may also execute a modification operation to implement the recommended modification. For example, the optimization system can adjust the configuration settings of the active cluster 104 to match the similar cluster.

Figure 2:
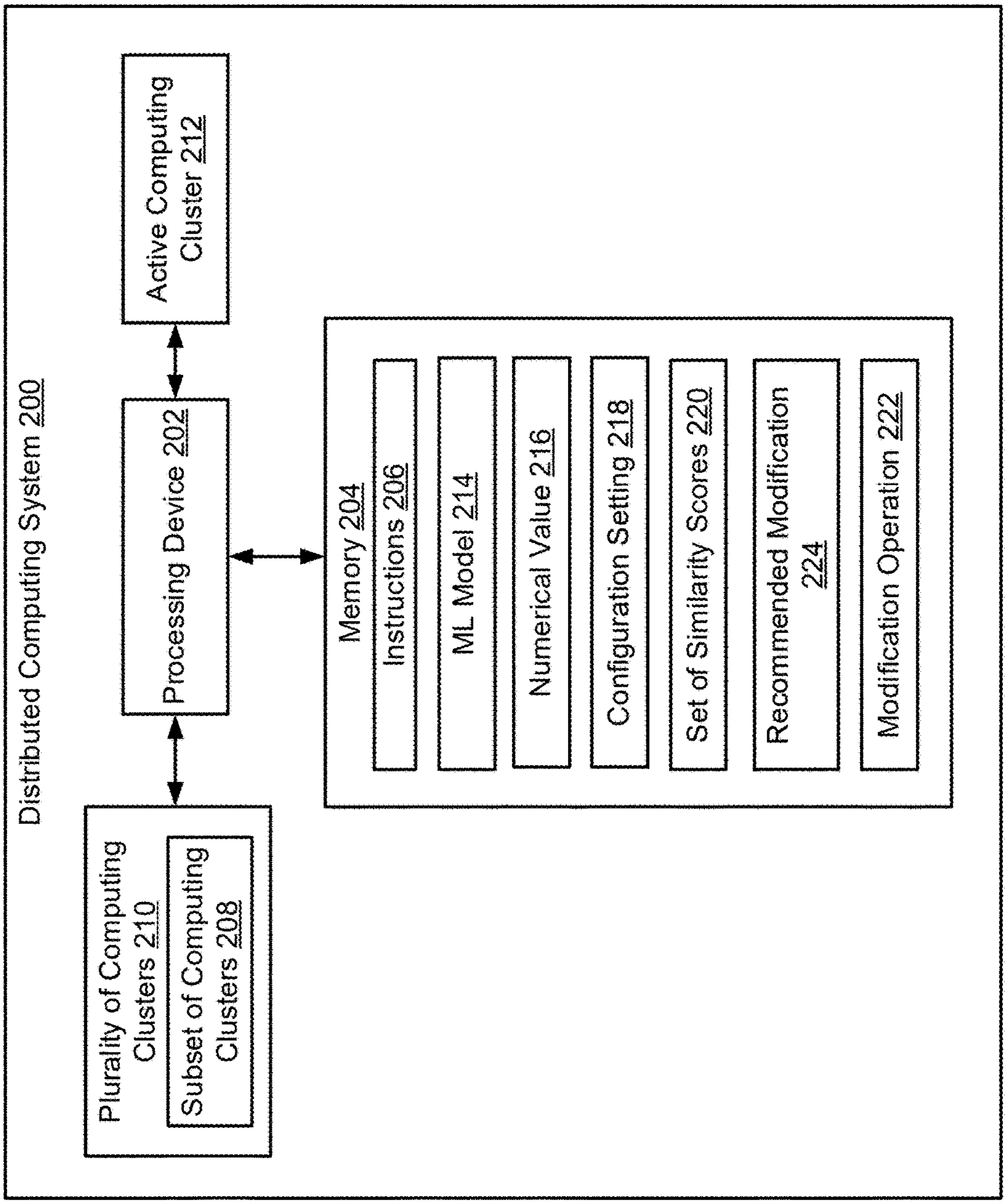
FIG. 2 shows a block diagram of another example of a distributed computing environment for modifying cluster configuration settings using machine learning, according to some aspects of the present disclosure.

FIG. 2 shows a block diagram of another example of a distributed computing environment 200 for modifying cluster configuration settings using machine learning according to some aspects of the present disclosure. The distributed computing environment 200 includes a processing device 202 communicatively coupled to a memory 204. The processing device 202 can include one processing device or multiple processing devices. Non-limiting examples of the processing device 202 include a Field-Programmable Gate Array (FPGA), an application-specific integrated circuit (ASIC), a microprocessor, etc. The processing device 202 can execute instructions 206 stored in the memory 204 to perform the operations. In some examples, the instructions 206 can include processor-specific instructions generated by a compiler or an interpreter from code written in any suitable computer-programming language, such as C, C++, C#, etc.

Memory 204 can include one memory device or multiple memory devices. The memory 204 can be non-volatile and may include any type of memory device that retains stored information when powered off. Non-limiting examples of the memory 204 include electrically erasable and programmable read-only memory (EEPROM), flash memory, or any other type of non-volatile memory. At least some of the memory 204 can include a non-transitory computer-readable medium from which the processing device 202 can read instructions 206. A computer-readable medium can include electronic, optical, magnetic, or other storage devices capable of providing the processing device 202 with computer-readable instructions 206 or other program code. Examples of a computer-readable medium can include magnetic disks, memory chips, ROM, random-access memory RAM, an ASIC, a configured processor, optical storage, or any other medium from which a computer processor can read instructions 206.

The processing device 202 can execute instructions 206 to perform operations. For example, the processing device 202 can determine a numerical value 216 representative of a configuration setting 218 at an active computing cluster 212. The processing device 202 can further compute a set of similarity scores 220 using the numerical value 216. Each similarity score in the set of similar scores 220 can be indicative of a level of similarity of the active computing cluster 212 to each computing cluster of a plurality of computing clusters 210 with respect to the configuration setting 218. Additionally, the processing device 202 can select, based on at least in part on the set of similarity scores 220 and using a machine learning (ML) model 214, a subset of computing clusters 208 from the plurality of computing clusters 210. The processing device 202 can also generate a recommended modification 224 to the configuration setting 218 based on the subset of computing clusters 208. The processing device 202 may further execute a modification operation 222 to implement the recommended modification 24 to the configuration setting 218.

Figure 3:
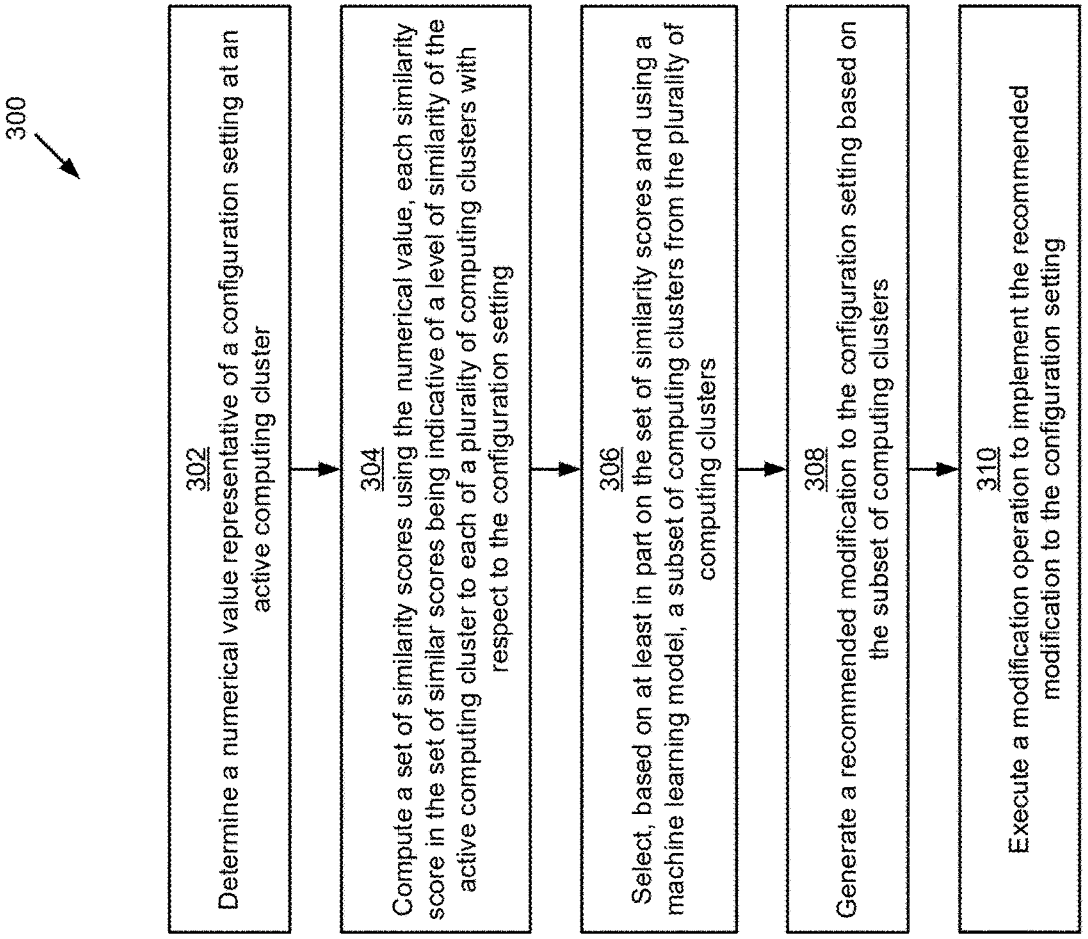
FIG. 3 shows a flowchart of an example of a process for modifying cluster configuration settings using machine learning, according to some aspects of the present disclosure.

FIG. 3 shows a flow chart of an example of a process 300 for managing data encryption during system upgrades according to some aspects of the present disclosure. In some examples, the processing device 202 can perform one or more of the steps shown in FIG. 3. For example, the processing device 202 can execute the optimization system 102 of FIG. 1 to perform one or more of the steps shown in FIG. 3. In other examples, the processing device 202 can implement more steps, fewer steps, different steps, or a different order of the steps depicted in FIG. 3. The steps of FIG. 3 are described below with reference to components discussed above in FIGS. 1-2.

At block 302, the processing device 202 can determine a numerical value 216 representative of a configuration setting 218 at an active computing cluster ("active cluster") 212. In an example, the configuration setting 218 can be a first configuration setting and can be associated with one or more microservices of a software product (e.g., an e-commerce platform) deployed on the active cluster 212. The microservices can carry out workloads of the software product. For example, a workload carried out by each microservice may include user authentication, inventory management, payment processing, etc.

In the example, the first configuration setting can be a replica count of a microservice of the software product (e.g., a microservice performing inventory management). The numerical value 216 can therefore be a first numerical value and can be the number of replicas the microservice uses (e.g., 2). In the example, the processing device 202 may further determine a second numerical value representative of a second configuration setting at the active cluster 212. The second configuration setting can be another replica count of an additional microservice of the software product (e.g., a microservice for payment processing). Thus, the second numerical value can be the number of replicas used by the additional microservice (e.g., 5).

At block 304, the processing device 202 can compute a set of similarity scores 220 using the numerical value 216. In the example, the set of similarity scores 220 can be a first set of similarity scores. To compute the first set of similarity scores, the processing device 202 may receive, for each of a plurality of computing clusters ("clusters") 210, an additional numerical value. In the example, the additional numerical values can be a replica count of a microservice of each of the clusters 210. The microservice of each of the clusters 210 can be similar to the microservice of interest (e.g., the microservice performing inventory management). The clusters 210 can be clusters at which the software product or other versions of the software product have been deployed, clusters at which other e-commerce platforms or similar software products have been deployed, or other suitable clusters related to the active cluster 212. After receiving the additional numerical values that are each associated with one of the clusters 210, the processing device 202 can use each additional numerical value and the first numerical value to compute the first set of similarity scores. Thus, each similarity score in the first set of similarity scores can be indicative of a level of similarity of the active cluster 212 to each of the clusters 210 of with respect to the first configuration setting.

The processing device 202 may also receive, for each of the clusters 210, second additional numerical values representative of the second configuration setting. That is, the second additional numerical values can be a replica count of another microservice of each of the clusters 210 similar to the microservice for payment processing. After receiving the second additional numerical values, the processing device 202 can use each numerical value in the second additional numerical values and the second numerical value to compute a second set of similarity scores. Thus, each similarity score in the second set of similarity scores can be indicative of a level of similarity of the active computing cluster 212 to each of the clusters 210 with respect to the second configuration setting.

Additionally, in some examples, the processing device 202 may generate an overall similarity score for each the clusters 210 with respect to the active cluster 212. The overall similarity score can be based on the first set of similarity scores and the second set of similarity scores. For example, for each of the clusters 210 there can be a first similarity score in the first set of similarity scores corresponding to the first configuration setting and a second similarity score in the second set of similarity scores corresponding to the second configuration setting. Thus, generating the overall similarity score can involve adding the similarity scores of each cluster, averaging the similarity scores of each cluster, generating a weighted average of the similarity scores, etc.

At block 306, the processing device 202 can select, based on at least in part on the set of similarity scores 220 and using a machine learning model 214, a subset of computing clusters 208 from the plurality of computing clusters 210. In the example, the processing device 202 can input the first set of similarity scores, the second set of similarity scores, the overall similarity score for each of the clusters 210, or the combination thereof into a machine learning (ML) model (e.g., a k-means model). The ML model can be trained to select a K closest computing clusters to the active cluster 212 based on the first set of similarity scores, the second set of similarity scores, the overall similarity score for each of the clusters 210, or the combination thereof. K can be any value (e.g., 1, 5, 10, 15, 20, 30, 40, 50, etc. or any number therebetween). The subset of computing clusters 208 selected can therefore be the K closest computing clusters selected using the ML model.

At block 308, the processing device 202 can generate a recommended modification 224 to the configuration setting 218 based on the subset of computing clusters 208. The processing device 202 can use the additional numerical values and the second additional numerical values for each computing cluster in the subset of computing clusters 208 to generate the recommended modification 224. That is, the processing device 202 can take the numerical values used at the subset of clusters 208 for the first configuration setting and the second configuration setting respectively. The processing device 202 may then compute the mode, average, median, or the like of the numerical values corresponding to the first configuration setting at the subset of clusters 208 and of the numerical values corresponding to the second configuration setting at the subset of clusters 208.

In the example, the processing device 202 may determine that a majority of the numerical values for both configuration settings are five. Thus, the processing device 202 can generate the recommended modification 224 to indicate the replica count of the microservice performing inventory management should be increased to 5. The processing device 202 can then generate an output comprising the recommended modification 224 and transmit the output to a user device. For example, the output can be displayed to a user in an integrated development environment (IDE) running on the user device.

At block 310, the processing device 202 may execute a modification operation 222 to implement the recommended modification to the configuration setting. For example, the processing device 202 may change the replica count of the microservice from 2 to 5.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:

a processing device; and a memory device that includes instructions executable by the processing device for causing the processing device to perform operations comprising:

determining a first numerical value representative of an amount of central processing unit (CPU) resources allocated to a microservice of an active computing cluster and a second numerical value indicative of an amount of memory allocated to the microservice of the active computing cluster;

computing a first set of similarity scores using the first numerical value, each similarity score in the first set of similarity scores being indicative of a level of similarity of the active computing cluster to one of a plurality of computing clusters with respect to the amount of CPU resources allocated to the microservice;

computing a second set of similarity scores using the second numerical value, each similarity score in the second set of similarity scores being indicative of a level of similarity of the active computing cluster to one of the plurality of computing clusters with respect to the amount of memory allocated to the microservice;

generating a set of overall similarity scores based on the first set of similarity scores and the second set of similarity scores;

selecting, based on the set of overall similarity scores and using a machine learning model, a subset of computing clusters from the plurality of computing clusters;

generating a recommended modification to the amount of CPU resources or the amount of memory allocated to the microservice based on the subset of computing clusters; and adjusting the amount of CPU resources or the amount of memory allocated to the microservice according to the recommended modification.

2. The system of claim 1, wherein the operations further comprise generating an output comprising the recommended modification and transmitting the output to a user device.

3. The system of claim 1, wherein the operations further comprise:

determining a third numerical value representative of a storage setting at the active computing cluster; and computing a third set of similarity scores using the third numerical value, wherein each similarity score in the third set of similarity scores is indicative of a level of similarity of the active computing cluster to one of the plurality of computing clusters with respect to the storage setting.

4. The system of claim 3, wherein the operation of generating the set of overall similarity scores is is based on the first set of similarity scores, the second set of similarity scores, and the third set of similarity scores.

5. The system of claim 1, wherein the operations further comprise:

receiving, for each computing cluster of the plurality of computing clusters an additional numerical value indicative of an associated amount CPU allocation and an additional numerical value indicative of an associated amount of memory allocation;

wherein computing the first set of similarity scores using the first numerical value further comprises using the additional numerical value indicative of the associated amount CPU allocation for each computing cluster of the plurality of computing clusters; and wherein computing the second set of similarity scores using the second numerical value further comprises using the additional numerical value indicative of the associated amount of memory allocation for each computing cluster of the plurality of computing clusters.

6. The system of claim 5, wherein the operation of generating the recommended modification is based on the additional numerical value indicative of the associated amount CPU allocation or the additional numerical value indicative of the associated amount of memory allocation for each computing cluster in the subset of computing clusters.

7. The system of claim 1, wherein the machine learning model is a first machine learning model, and wherein the operations further comprise:

inputting a plurality of configuration settings associated with the active computing cluster into a second machine learning model, wherein the plurality of configuration settings include the amount of CPU resources and the amount of memory allocated to the microservice; and outputting, by the second machine learning model, the amount of CPU resources or the amount of memory allocated to the microservice.

8. A method comprising:

determining a first numerical value representative of an amount of central processing unit (CPU) resources allocated to a microservice of an active computing cluster and a second numerical value indicative of an amount of memory allocated to the microservice of the active computing cluster;

computing a first set of similarity scores using the first numerical value, each similarity score in the first set of similarity scores being indicative of a level of similarity of the active computing cluster to one of a plurality of computing clusters with respect to the amount of CPU resources allocated to the microservice;

computing a second set of similarity scores using the second numerical value, each similarity score in the second set of similarity scores being indicative of a level of similarity of the active computing cluster to one of the plurality of computing clusters with respect to the amount of memory allocated to the microservice;

generating a set of overall similarity scores based on the first set of similarity scores and the second set of similarity scores;

selecting, based on the set of overall similarity scores and using a machine learning model, a subset of computing clusters from the plurality of computing clusters;

generating a recommended modification to the amount of CPU resources or the amount of memory allocated to the microservice based on the subset of computing clusters; and adjusting the amount of CPU resources or the amount of memory allocated to the microservice according to the recommended modification.

9. The method of claim 8, further comprising generating an output comprising the recommended modification and transmitting the output to a user device.

10. The method of claim 8, wherein the method further comprises:

determining a third numerical value representative of a storage setting at the active computing cluster; and computing a third set of similarity scores using the third numerical value, wherein each similarity score in the third set of similarity scores is indicative of a level of similarity of the active computing cluster to one of the plurality of computing clusters with respect to the storage setting.

11. The method of claim 10, wherein generating the set of overall similarity scores is based on the first set of similarity scores, the second set of similarity scores, and the third set of similarity scores.

12. The method of claim 8, further comprising:

receiving, for each computing cluster of the plurality of computing clusters an additional numerical value indicative of an associated amount CPU allocation and an additional numerical value indicative of an associated amount of memory allocation; and wherein computing the first set of similarity scores using the numerical value further comprises using the additional numerical value indicative of the associated amount CPU allocation for each computing cluster of the plurality of computing clusters; and wherein computing the second set of similarity scores using the second numerical value further comprises using the additional numerical value indicative of the associated amount of memory allocation for each computing cluster of the plurality of computing clusters.

13. The method of claim 12, wherein generating the recommended modification is based on the additional numerical value indicative of the associated amount CPU allocation or the additional numerical value indicative of the associated amount of memory allocation for each computing cluster in the subset of computing clusters.

14. The method of claim 8, wherein the machine learning model is a first machine learning model, and wherein the method further comprises:

inputting a plurality of configuration settings associated with the active computing cluster into a second machine learning model, wherein the plurality of configuration settings include the amount of CPU resources and the amount of memory allocated to the microservice; and outputting, by the second machine learning model, the amount of CPU resources or the amount of memory allocated to the microservice.

15. A non-transitory computer-readable medium comprising instructions that are executable by a processing device for causing the processing device to perform operations comprising:

determining a first numerical value representative of an amount of central processing unit (CPU) resources allocated to a microservice of an active computing cluster and a second numerical value indicative of an amount of memory allocated to the microservice of the active computing cluster;

computing a first set of similarity scores using the first numerical value, each similarity score in the first set of similarity scores being indicative of a level of similarity of the active computing cluster to one of a plurality of computing clusters with respect to the amount of CPU resources allocated to the microservice;

computing a second set of similarity scores using the second numerical value, each similarity score in the second set of similarity scores being indicative of a level of similarity of the active computing cluster to one of the plurality of computing clusters with respect to the amount of memory allocated to the microservice;

generating a set of overall similarity scores based on the first set of similarity scores and the second set of similarity scores;

selecting, based at least in part on the set of overall similarity scores and using a machine learning model, a subset of computing clusters from the plurality of computing clusters;

generating a recommended modification to the amount of CPU resources or the amount of memory allocated to the microservice based on the subset of computing clusters; and adjusting the amount of CPU resources or the amount of memory allocated to the microservice according to the recommended modification.

16. The non-transitory computer-readable medium of claim 15, wherein the operations further comprise generating an output comprising the recommended modification and transmitting the output to a user device.

17. The non-transitory computer-readable medium of claim 15, wherein the operations further comprise:

determining a third numerical value representative of a storage setting at the active computing cluster; and computing a third set of similarity scores using the third numerical value, wherein each similarity score in the third set of similarity scores is indicative of a level of similarity of the active computing cluster to one of the plurality of computing clusters with respect to the storage setting.

18. The non-transitory computer-readable medium of claim 17, wherein the operation of generating the set of overall similarity scores is based on the first set of similarity scores, the second set of similarity scores, and the third set of similarity scores.

19. The non-transitory computer-readable medium of claim 15, wherein the operations further comprise:

receiving, for each computing cluster of the plurality of computing clusters an additional numerical value indicative of an associated amount CPU allocation and an additional numerical value indicative of an associated amount of memory allocation;

wherein computing the first set of similarity scores using the first numerical value further comprises using the additional numerical value indicative of the associated amount CPU allocation for each computing cluster of the plurality of computing clusters; and wherein computing the second set of similarity scores using the second numerical value further comprises using the additional numerical value indicative of the associated amount of memory allocation for each computing cluster of the plurality of computing clusters.

20. The non-transitory computer-readable medium of claim 19, wherein the operation of generating the recommended modification is based on the additional numerical value indicative of the associated amount CPU allocation or the additional numerical value indicative of the associated amount of memory allocation for each computing cluster in the subset of computing clusters.

* * * * *